United States Patent [19]

Matsuura et al.

[11] Patent Number: 5,597,594
[45] Date of Patent: Jan. 28, 1997

[54] PROCESS FOR PREPARING CHEESE-LIKE FOOD PRODUCT

[75] Inventors: Masaru Matsuura; Jun Sasaki, both of Noda, Japan

[73] Assignee: Kikkoman Corporation, Noda, Japan

[21] Appl. No.: 403,426

[22] Filed: Feb. 28, 1995

[30] Foreign Application Priority Data

Mar. 3, 1994 [JP] Japan .................................. 6-056828

[51] Int. Cl.$^6$ ...................................... A23L 1/211
[52] U.S. Cl. ............................ 426/44; 426/478; 426/634
[58] Field of Search ............................... 426/44, 634, 478

[56] References Cited

U.S. PATENT DOCUMENTS

| | | | |
|---|---|---|---|
| 3,944,676 | 3/1976 | Fridman et al. | 426/582 |
| 4,636,398 | 1/1987 | Matsuura | 426/634 |
| 4,645,677 | 2/1987 | Lawhon et al. | 426/634 |
| 4,664,919 | 5/1987 | Yan et al. | 426/634 |

FOREIGN PATENT DOCUMENTS 57-3338   1/1982   Japan .
59-213358  12/1984   Japan .

OTHER PUBLICATIONS

Kawamura, "Oligosaccharides in Soybeans and its Change by Heat", *Food Industry, 8Ge*, 25 (1967) (partial translation).

*Primary Examiner*—Helen Pratt
*Attorney, Agent, or Firm*—Banner & Witcoff, Ltd.

[57] ABSTRACT

A cheese-like food is prepared using soybean milk in which 60% or more of the soluble saccharide fractions in the raw soybean are removed; subjecting the soybean milk to lactic acid fermentation to form curds; molding, fermenting and maturing the curds. The obtained cheese-like food closely resembles cheese prepared using milk as the raw material, and has an excellent flavor.

5 Claims, No Drawings

PROCESS FOR PREPARING CHEESE-LIKE FOOD PRODUCT

BACKGROUND OF THE INVENTION

1. Field of the Invention

This invention relates to a process for preparing of a cheese-like food product using soybean (soybean milk) as a raw material.

2. Description of the Prior Art

Recently, vegetable proteinaceous foods have been appraised because of high concerns about health. Particularly, food products prepared using raw soybean which contains a large amount of proteins of good quality are rated highly, and soybean milk beverages, meat-like foods, etc. as well as traditional processed foods, e.g. Tofu (soybean curds) and Natto (fermented soybeans) are commercially available.

Various research has also been made on cheese-like foods prepared using soybean(soybean milk) as a raw material, and many patent applications have been made such as Patent Kokoku No. 57-3338 "a process for preparation of a cheese-like food utilizing soybean milk" and Patent Kokai No. 59-213358 "a process for preparation of an improved cheese-like food".

The formation of curds together with progress of lactic acid fermentation is also essential for the production of a cheese-like food using soybean milk as a raw material, similarly in the production of cheese using milk. But, soybean milk cannot be coagulated with rennet which is a milk coagulating enzyme. In order to form good curds, accordingly, a process is proposed which comprises carrying out lactic acid fermentation, for example, using a lactic acid bacterium having heat resistance and accelerating curd formation at high temperatures of 70° to 80° C. However, this process has a disadvantage that use of a lactic acid bacterium having spores is necessary, because the process requires heat resistance of the lactic acid bacterium.

Although a process of using a specific coagulating enzyme capable of clotting soybean milk is also proposed, the process is not generally applied.

SUMMARY OF THE INVENTION

The present inventors have studied processes for forming soybean milk curds by lactic acid fermentation where a usual mesophilic lactic acid bacterium is used; as a result found that curds of good quality can be obtained by using soybean milk in which 60% or more of the soluble saccharide fractions in the raw soybean was removed; and completed this invention.

DETAILED DESCRIPTION OF THE INVENTION

This invention is specifically described below.

(1) Preparation step of soybean milk

One of the characteristics of this invention is to use soybean milk in which at least 60% of the soluble saccharide fractions in the raw soybean has been removed. As processes for preparing such soybean milk, there are a process comprising previously removing soluble saccharide fractions from the starting soybean and grinding the resultant soybean to give soybean milk, and a process comprising filtering soybean milk with an ultrafiltration membrane to remove soluble saccharide fractions.

The soluble saccharide fractions referred to in this invention mean water soluble saccharide fractions eluted by soaking in water, grinding or the like, and their total amount may be determined according to the following method. Namely, raw soybeans are soaked in a given amount of water and ground together with the water; the soybean milk obtained by filtration of the ground mixture is adjusted to pH 4.5 with hydrochloric acid to precipitate proteins and centrifuged; and the saccharide concentration of the supernatant is determined according to the phenol-sulfuric acid method as a glucose amount.

As a process of removing at least 60% of soluble saccharide fractions from raw soybean such as whole soybean or dehulled soybean, there is a process comprising soaking the raw soybean in water to elute soluble saccharide fractions into the soaking water.

For example, 60 to 80% of the soluble saccharide fractions can be eluted and removed into the soaking water by soaking raw soybean at 50° to 55° C. for 6 to 10 hours in the case of whole soybean or at 30° to 55° C. for 2 to 10 hours in the case of dehulled soybean.

When the soluble saccharide fractions are eluted by soaking, it is desirable to use the raw intact soybeans as they are, without impairing the parts of the soybean such as the albumen. The reason is that when the intact soybeans or the dehulled soybeans are ground or crushed and their cells are destroyed, enzymes such as lipoxydase are contacted with their substrates to give out off-flavor or off-taste, and elution of the proteins in addition to elution of the saccharides is accelerated, which leads to an increased loss of the proteins. The resultant soybeans from which the soluble saccharide fractions are removed may be if necessary, washed with water and drained, and charged together with 2 to 8 volumes of water in a grinder and ground.

The grinding may be carried out at ordinary temperature, but is preferably carried out under a low temperature of 10° C. or less or under a high temperature of 80° C. or more so as to prevent a quality deterioration due to the action of lipoxydase or peroxidase at the time of grinding.

The soybean slurry "Go" obtained by the grinding is heated at 95° to 110° C. for 0.5 to 5 minutes and filtered to be separated into the soybean cake and the soybean milk, and thereby soybean milk in which at least 60% of the soluble saccharide fractions were removed may be obtained.

It is also possible to adopt a process comprising filtering soybean milk with an ultrafiltration membrane to remove soluble saccharide fractions. For example, raw soybean such as whole soybean or dehulled soybean are either soaked in water under usual soaking conditions, e.g. in water of 18° to 25° C. for 12 to 16 hours; if necessary, washed with water and drained; put together with 2 to 8 volumes of water in a grinder and ground; or directly put together with 4 to 10 volumes of water in a grinder and ground to produce the raw Go. The Go is heated at 95° to 110° C. for 0.5 to 5 minutes and filtered to be separated into the soybean cake and the soybean milk, and the soybean milk is filtered with an ultrafiltration membrane to remove the soluble saccharide fractions.

When the soybean milk is previously subjected to homogenization treatment, the efficiency of the membrane treatment can be increased, and when the soybean milk is previously subjected to heat treatment of 120° to 150° C. for 0.5 to 240 seconds aiming at sterilization, contamination with microorganisms during the membrane treatment can be prevented.

Usable ultrafiltration membranes are those having a cut-off molecular weight of 30,000 or more, preferably 30,000 to 300,000. When a membrane having a cut-off molecular weight of less than 30,000 is used, the filtration efficiency is poor, and a membrane having a too large cut-off molecular weight brings about lowering of the raw material utilization rate because proteins in the soybean milk also pass through it.

The ultrafiltration membranes include those composed of synthetic high molecular materials such as polysulfone, polyolefin and polyacrylonitrile, and zirconia ceramic membrane, etc., and their shapes can be as usual, e.g. tabular shapes or hollow fiber shapes. The removal of the soluble saccharides can be carried out to some extent by mere concentration with the ultrafiltration membrane, but in the case of soybean milk having a high protein concentration, so-called "diafiltration" becomes necessary where low molecular components are positively removed while water is added.

The extent of removal of the soluble saccharide fractions is 60% or more of the soluble saccharide fractions in the raw soybean, and since when the soaked soybeans are used, some extent of the soluble saccharide fractions are eluted and removed during the soaking step, the removal by the ultrafiltration membrane treatment can be carried out so that the removal extent may become 60% or more in total.

(2) Lactic acid fermentation step

The thus obtained soybean milk in which at least 60% of the soluble saccharide fractions in the raw soybean was removed is heat-sterilized at 135° to 150° C. for 0.5 to 120 seconds and cooled, and sugar and a lactic acid bacterium or the mixed bacteria are added. The sugar includes lactose, glucose, sucrose, fructose, etc., and lactose is particularly preferable. The amount thereof added is 0.2 to 5%, preferably 1 to 2% based on the soybean milk. The lactic acid bacterium may be a commercially available lactic acid bacterium used in preparation of milk cheese, and includes a single bacterium or mixed bacteria, for example from *Lactobacillus bulgaricus, Lactobacillus acidophilus, Streptococcus thermophilus, Lactobacillus helveticus, Lactobacillus casei, Streptococcus cremoris, Streptococcus lactis, Leuconostoc cremoris, Streptococcus diacetylactis*, etc., and is added as a starter after being precultured by a usual method.

If necessary, a divalent metallic salt such as calcium chloride, magnesium chloride and calcium sulfate may be added as a coagulation accelerator.

The lactic acid fermentation is carried out at 20° to 45° C. for 2 to 20 hours, preferably at 30° to 40° C. for 3 to 6 hours. Thereby the pH of the soybean milk is lowered with a fermentation of the lactic acid bacterium, and the whole soybean milk is uniformly turned into a solid mass and curds are formed.

(3) Solid-liquid separation step

This solid-liquid separation step and the following molding, fermentation and maturing steps are entirely the same as in the process of preparation of cheese using milk as the raw material. Description is made below taking for instance the case where Camembert cheese is prepared. Curds formed by the lactic acid fermentation are cut into sizes of an order of 1 to 2 cm square with a curd knife and allowed to stand while warmed to around 40° C. to exude the whey, and part of the whey is removed. The resultant curds are uniformly transferred into hoops set in an inverting machine; the inverting machine is covered with a lid; and the curds are inverted, at room temperature, 4 to 5 times at intervals of 15 minutes, 4 to 5 times at intervals of 30 minutes, and further about 3 times at intervals of 2 hours, and allowed to stand for 7 to 8 hours. Thereby the whey is discharged to give curds having proper hardness.

(4) Molding, fermentation and maturing steps

The curds are taken out from the hoops, cut to the thickness of 25 to 30 mm, and immersed in 20% brine for 10 to 20 minutes for the purpose of preserving, fermentation-controlling and flavoring them. The curds are then taken out from the brine, drained, and left for 2 to 8 hours for drying in a chamber inside which humidity is about 60%.

Commercially available Camembert cheese-like mold powder, for example Penicillium super.active made by Christian Hansen Co. is suspended in sterilized water, and inoculated on the surface of the dried curds by a method such as spraying.

The curds after mold inoculation are placed on a reticular or slatted drainboard-like shelf, and left alone at 10° to 20° C. for 2 to 10 days to spread hyphae sufficiently. In the meantime the curds are inversed about once a day. The curds are wrapped respectively in plastic film, put in vessels at a rate of one wrap per vessel, and matured at 2° to 10° C. for 7 to 14 days to give a product.

The resulting product is a product having the same smooth texture as Camembert cheese prepared using milk as the raw material and free from bean flavors.

The above situation is of course the same in other cheeses.

The effects of this invention are described below by experimental examples.

EXPERIMENTAL EXAMPLE (1) Preparation of soybean milk

Sample 1: Dehulled soybeans were soaked for one hour in water (50° C.) of 5 times the weight of the raw soybean; the soaking water was removed; the soaked soybeans were washed with water and drained, and ground together with hot water (95° C.) of 4 times the weight of the raw soybean; and the resultant Go was heat-treated at 105° C. for 30 seconds, cooled to 80° C., and subjected to solid-liquid separation using a screw decanter to give soybean milk. The soybean milk was deaerated, sterilized at 150° C. for 5 seconds, and cooled to 25° C. The removal rate of the soluble saccharide fractions of this soybean milk was 39.5%.

Sample 2: Dehulled soybeans were soaked for 6 hours in water (20° C.) of 5 times the weight of the raw soybean; the soaking water was removed; the soaked soybeans were washed with water and drained, and ground together With hot water (95° C.) of 4 times the weight of the raw soybean; and the resultant Go was heat-treated at 105° C. for 30 seconds, cooled to 80° C. and subjected to solid-liquid separation using a screw decanter to give soybean milk. The soybean milk was deaerated, sterilized at 150° C. for 5 seconds, and cooled to 25° C. The removal rate of the soluble saccharide fractions of this soybean milk was 50.2%.

Sample 3: Dehulled soybeans were soaked for 2 hours in water (50° C.) of 5 times the weight of the raw soybean; the soaking water was removed; the soaked soybeans were washed with water and drained, and ground together with hot water (95° C.) of 4 times the weight of the raw soybean; and the resultant Go was heat-treated at 105° C. for 30 seconds, cooled to 80° C., and subjected to solid-liquid separation using a screw decanter to give soybean milk. The soybean milk was deaerated, sterilized at 150° C. for 5 seconds, and cooled to 25° C. The removal rate of the soluble saccharide fractions of this soybean milk was 51.5%.

Sample 4: Dehulled soybeans were soaked for 3 hours in water (50° C.) of 5 times the weight of the raw soybean; the soaking water was removed; the soaked soybean was washed with water and drained, and ground together with hot water (95° C.) of 4 times the weight of the raw soybean; and the resultant Go was heat-treated at 105° C. for 30 seconds, cooled to 80° C., and subjected to solid-liquid separation using a screw decanter to give soybean milk. The soybean milk was deaerated, sterilized at 150° C. for 5 seconds, and cooled to 25° C. The removal rate of the soluble saccharide fractions of this soybean milk was 61.0%.

Sample 5: Dehulled soybeans were soaked for one hour in water (50° C.) of 5 times the weight of the raw soybean; the soaking water was removed; the soaked soybeans were soaked again for one hour in 5 volumes of water (50° C.); the soaking water was removed; the soaked soybeans were washed with water and drained, and ground together with hot water (95° C.) of 4 times the weight of the raw soybean; and the resultant Go was heat-treated at 105° C. for 30 seconds, cooled to 80° C., and subjected to solid-liquid separation using a screw decanter to give soybean milk. The soybean milk was deaerated, sterilized at 150° C. for 5 seconds, and cooled to 25° C. The removal rate of the soluble saccharide fractions of this soybean milk was 70.3%.

Sample 6: Dehulled soybeans were ground together with water (2° C.) of 5 times the weight of the raw soybeans. The resultant Go was heat-treated at 105° C. for 30 seconds, cooled to 80° C. and subjected to solid-liquid separation using a screw decanter to give soybean milk. This soybean milk was deaerated, sterilized at 150° C. for 5 seconds, and cooled to 25° C. Then, after the soybean milk was diluted with the same amount of sterilized water, the mixture was subjected to ultrafiltration with a zirconia ceramic membrane (Carbosep Membrane M-1 manufactured by Sumitomo Heavy Engineering Industry Environtec Co.) having 300,000 of a cut-off molecular weight to obtain a soybean milk. The removal rate of the soluble saccharide fractions was 61.0%.

(2) Lactic acid fermentation and formation of curds

The protein concentration of each soybean milk prepared in (1) was adjusted to 3.5% and, lactose and calcium chloride were added to 10 L of the soybean milk so that the respective concentrations could be 2% and 0.05%. 200 mL of culture broth of mixed bacteria CH—N-01 (sold by Christian Hansen Co., Sweden) of lactic acid bacteria *Streptococcus cremoris, Streptococcus lactis, Leuconostoc cremoris, Streptococcus diacetylactis* was added as a starter, and the mixture was subjected to lactic acid fermentation at 30° C. in a culture vessel until the pH of the soybean milk became around 5.8, warmed to 32° C. and subjected to lactic acid fermentation for further one hour to form curds.

For acceleration of separation of the whey, the curds were cut into about 1.5 cm square and allowed to stand for one hour. The whey separated on the top of the curd layers was removed, the curds were transferred into hoops set in an inverting machine and the inverting machine was covered with a lid. The curds were inverted, at room temperature, 4 times at intervals of minutes, 4 times at intervals of 30 minutes, and further 3 times at intervals of 2 hours, and allowed to stand for 8 hours. The curds in the hoops were taken out, and the weight of the curds was measured and the amount of proteins was measured according to the following method.

The results are shown in Table 1.

TABLE 1

| | Removal rate of soluble saccharide fractions (%) | pH of curds | Curd weight (g) | Protein yield (%)* | State of curds in the hoops |
|---|---|---|---|---|---|
| Sample 1 | 39.5 | 5.05 | 1006 | 34.8 | The extent of draining is poor, and the curds are very soft and cannot be cut to a definite thickness. |
| Sample 2 | 50.2 | 5.10 | 1104 | 37.1 | The curds crumbled, and when immersed in brine, easily collapsed. |
| Sample 3 | 51.5 | 5.00 | 1115 | 36.6 | The same as above |
| Sample 4 | 61.0 | 5.15 | 2172 | 72.5 | Rigid curds were formed |
| Sample 5 | 70.3 | 5.06 | 2567 | 87.8 | The same as above |
| Sample 6 | 61.0 | 5.12 | 2210 | 75.0 | The same as above |

*Protein yield: (Curd weight × Protein concentration of curds)/(Volume of starting soybean milk × Protein concentration of soybean milk)

The protein concentration was calculated by determining the total nitrogen amount according to the Kjeldahl method and multiplying the resultant value by a coefficient 6.25.

As apparent from the results shown in Table 1, when the soybean milks (Samples 4 to 6) prepared using as the raw soybean from which at least 60% of the soluble saccharide fractions were removed are subjected to lactic acid fermentation, about 2-fold by weight more of curds were formed, the protein yields were higher and the states of the curds were good, as compared with the cases where Samples 1 to 3 in which the removal rates of the soluble saccharide fractions were lower.

Example 1

50 kg of dehulled soybeans were soaked in 250 L of water of 50° C., one hour later the soaking water was removed and the dehulled soybean was soaked again in 250 L of fresh water of 50° C. The soaking water was then removed, the dehulled soybeans were washed with water and drained, and ground together with 200 L of hot water of 95° C. The resultant Go was heat-treated at 105° C. for 30 seconds, cooled to 80° C. and subjected to solid-liquid separation by a screw decanter to give soybean milk. The soybean milk was deaerated, sterilized at 145° C. for 10 seconds, and cooled to 30° C.

The protein concentration of this sterilized soybean milk was 6.2%, and its removal rate of the soluble saccharide fractions was 70.3%.

To 11.3 L of this soybean milk were added 8 L of sterilized 5% aqueous lactose solution, 0.2 L of 5% aqueous calcium chloride solution and 0.5 L of sterilized water. The protein concentration of this soybean milk was 3.5%. While the soybean milk was maintained at 30° C., 800 mg of the powder of the same mixed lactic acid bacteria CH—N-01 as used in Experimental Example was added after dissolved in 0.5 L of water and lactic acid fermentation was carried out in a culture vessel. When the pH of the soybean milk became 5.8, the soybean milk was warmed to 32° C. and held at that temperature for one hour.

The formed curds were cut into 1.5 cm squares, warmed to 40° C. and allowed to stand for one hour. Whey separated on the top of the curd layers was removed and the curds were transferred into hoops set in an inverting machine, inverted, at room temperature, 4 times at intervals of 15 minutes, 4 times at intervals of 30 minutes, and further 3 times at intervals of 2 hours, and allowed to stand for 8 hours.

The curds were taken out from the hoops, cut to the thicknesses of 30 mm, immersed in 20% brine for 10 minutes, drained, and dried at 20° C. for 5 hours under a sterile atmosphere. The spores of *Penicillium candidum* were sprayed on the surfaces of the curds, and the curds were left at 15° C. for 5 days. In the meantime the curds were inversed once a day. The curds were wrapped respectively one by one, and allowed to stand at 8° to 10° C. for 10 days.

The resulting cheese-like food product closely resembled in texture of Camembert cheese prepared using milk, and had excellent flavor.

Example 2

50 kg of skinned soybeans were ground together with 250 L of water of 2° C. The resultant Go was heat-treated at 105° C. for 30 seconds, cooled to 80° C. and subjected to solid-liquid separation using a screw decanter to obtain a soybean milk. The protein content of this soybean milk was 5.1%. The soybean milk was deaerated, sterilized at 150° C. for 5 seconds and cooled to 25° C. The soybean milk was diluted with the same amount of sterilized water and subjected to ultrafiltration with a zirconia ceramic membrane (Carbosep Membrane M-1 manufactured by Sumitomo Heavy Engineering Industry Envirotec Co.) having 300,000 of a cut-off molecular weight to obtain a soybean milk having 6.2% of protein content. The removal rate of the soluble saccharide fractions was 61.0%.

The lactic fermentation, solid-liquid separation of curd and molding were carried out using the soybean milk according to the procedures of Example 1 to obtain a cheese-like food product. The resulting product had a texture closely similar to that of Camembert cheese and excellent flavor.

What is claimed is:

1. A process for preparing of a cheese-like food product which comprises preparing soybean milk in which at least 60% of the soluble saccharide fractions are removed from raw soybeans; adding a saccharide and a lactic acid bacterium or mixed lactic acid bacteria to the soybean milk and carrying out lactic acid fermentation; subjecting curds formed by the lactic acid fermentation to solid-liquid separation; and molding, fermenting and maturing the curds after the solid-liquid separation.

2. The process according to claim 1 wherein the removal of the soluble saccharide fractions is carried out from the raw soybean or soybean milk.

3. The process according to claim 1 wherein the soluble saccharide fractions are removed by soaking raw soybeans in water of 30° to 55° C. for 2 to 10 hours.

4. The process according to claim 1 wherein the soluble saccharide fractions are removed by filtering soybean milk with an ultrafiltration membrane.

5. The process according to claim 1 wherein the lactic acid bacterium is at least one bacterium selected from the group consisting of *Lactobacillus bulgaricus, Lactobacillus acidophilus, Streptococcus thermophilus, Lactobacillus helveticus, Lactobacillus casei, Streptococcus cremoris, Streptococcus lactis, Leuconostoc cremoris* and *Streptococcus diacetylactis*.

* * * * *